United States Patent [19]

Bloomer

[11] Patent Number: 4,513,207
[45] Date of Patent: Apr. 23, 1985

[54] ALTERNATING COMPARATOR CIRCUITRY FOR IMPROVED DISCRETE SAMPLING RESISTANCE CONTROL

[75] Inventor: Milton D. Bloomer, Scotia, N.Y.

[73] Assignee: General Electric Company, Schenectady, N.Y.

[21] Appl. No.: 565,306

[22] Filed: Dec. 27, 1983

[51] Int. Cl.³ .............................................. H01H 47/00
[52] U.S. Cl. .................................... 307/126; 307/310; 323/245
[58] Field of Search ....................... 307/31, 32, 33, 35, 307/126, 130, 131, 140, 310, 491, 262, 362; 323/245, 369, 209–211, 905; 363/79; 315/298

[56] References Cited

U.S. PATENT DOCUMENTS

| | | | |
|---|---|---|---|
| 4,117,355 | 9/1978 | Fleischer | 307/310 |
| 4,375,595 | 3/1983 | Ulmer et al. | 307/310 X |
| 4,421,993 | 12/1983 | Bloomer | 307/126 |
| 4,461,990 | 7/1984 | Bloomer | 323/235 |

*Primary Examiner*—A. D. Pellinen
*Assistant Examiner*—Todd E. DeBoer
*Attorney, Agent, or Firm*—Geoffrey H. Krauss; James C. Davis, Jr.; Marvin Snyder

[57] ABSTRACT

A pair of comparators, each having the same reference potential at a first input, each have a second input alternatingly receiving different ones of first and second signals relating to the magnitude of a parameter to be controlled. The results of a first comparison, with a first parameter signal connected to the input of the first comparator and the second comparator receiving the remaining parameter signal, is commutated by comparator output circuitry to means for realizing the algebraic difference of the signals and for intermediately storing this difference. During a second sampling period, when the inputs are reversed, the algebraic difference circuitry provides another set of signals to the intermediate storage circuit, which second set of signals have parametric changes of opposite direction and substantially equal magnitude to errors introduced by the comparators during the first sampling, such that the intermediately-stored algebraic difference of the two sample sets is substantially free of any effects due to input offset and other errors between the pair of comparators.

19 Claims, 7 Drawing Figures

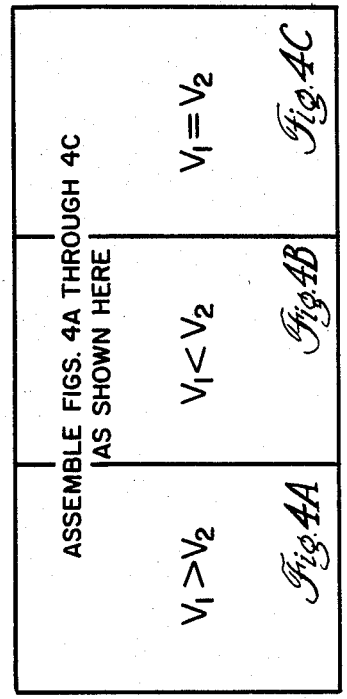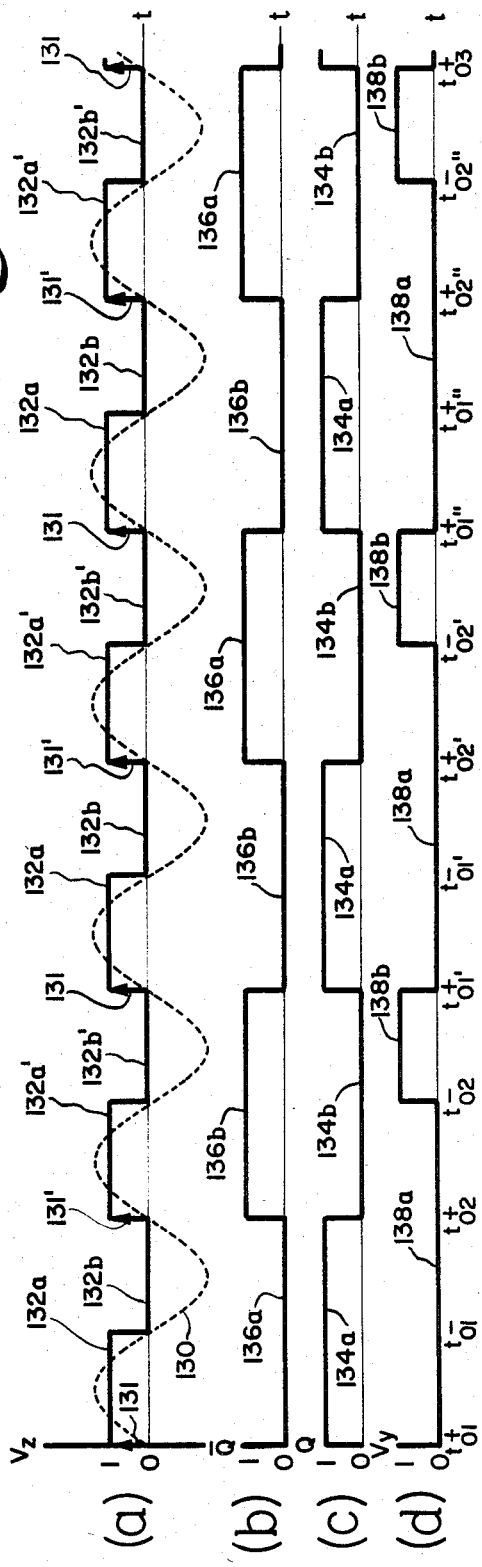

ALTERNATING COMPARATOR CIRCUITRY FOR IMPROVED DISCRETE SAMPLING RESISTANCE CONTROL

BACKGROUND OF THE INVENTION

The present application relates to load control apparatus and, more particularly, to novel improved resistance load sampling and control circuitry in which comparator input offset errors are substantially cancelled.

It is often desirable to operate a lower-voltage load from a higher-voltage source periodic waveform. Typically, such loads are resistive and have a significant resistive temperature coefficient. When this type of load, such as a lamp, resistance heater element and the like, is to be energized from A.C. mains, less than the full mains voltage is required thereacross for proper operation, and a power switching device is included in series with the load, across the mains, for controlling load current conduction. In such cases, a highly-efficient low-voltage power supply is required for energizing the load. It is known to monitor the load resistance and provide for closed-loop control of the non-zero-temperature-coefficient load resistance. Apparatus for achieving such control is disclosed and claimed in my allowed application Ser. No. 382,875, filed May 28, 1982 now U.S. Pat. No. 4,421,993, and in another co-pending application Ser. No. 432,000, filed Oct. 1, 1982 now U.S. Pat. No. 4,461,990, both of which applications are assigned to the assignee of the present application and incorporated in their entireties herein by reference. The resistance comparators disclosed and claimed therein, as well as many other electronic circuits, require the analog comparison of relatively low-level signals on the order of several tens, or hundreds, of millivolts. In both applications, the discrete resistance comparator means requires that a pair of analog comparators be utilized. One comparator provides an output state change when a voltage, proportional to the load voltage, crosses a fixed reference voltage level, while the second comparator provides an output state change when a second voltage, proportional to the load current, crosses a fixed, typically the same, reference voltage level. Since the voltage-proportional-to-current may be limited in magnitude, by allowable power dissipation in a sampling resistance placed in series with the load, to about 100 millivolts, an error of about 1 percent occurs for each millivolt of differential offset drift between the two comparators. Differential offset drift can be controlled utilizing relatively high-quality comparators operating over a moderate temperature range; however, large and intolerable errors result if custom or semicustom integrated circuits, particularly utilizing MOS devices, are utilized to realize a reduced-cost discrete resistance comparator utilizing a pair of analog comparators therein. The error in such use results from the well-known input offset drift of comparators with temperature.

It has been suggested to solve the input offset drift problem by utilization of a single comparator which is switched to alternately sample voltage and current at a rate which is relatively fast when compared to the A.C. mains line frequency (e.g. 60 Hz. in the United States). Utilization of a single comparator can eliminate the offset problem, but degrades discrete resistance comparator performance due to slew rate and other operational amplifier limitations. This is true because the ideal resistance measurement requires that voltage and current be measured at the same relative time in the applied source waveform cycle. Utilizing a single comparator, the load voltage and load current samples are separated by some small switching time, e.g. 10 microseconds, which results in the current and voltage samples occurring at different points on the source waveform cycle, e.g. about 0.22° apart. During this small switching interval, the indicated load resistance has then changed by some amount, e.g. about 0.22 percent, between the current and voltage samples and results in an apparent hysteresis, or deadband, which contributes unwanted random data about the resistance control point. It has been suggested to utilize a faster sample clock rate to reduce these effects, but present MOS comparator circuits have slew rate limitations which already contribute to the error at the present sampling rates and provide slew rate limitations which prevent increasing the sampling rate thereover.

Accordingly, it is desirable to continue to utilize a pair of analog comparators, each operating upon a sample of a different one of the load current and voltage waveforms, and to provide circuitry in which any change with respect to the desired comparison level in input offset of either of the two comparators is reduced or, more preferably, substantially cancelled.

BRIEF SUMMARY OF THE INVENTION

In accordance with the invention, an alternating comparator circuit, as e.g. for realizing an improved discrete sampling resistance control, utilizes a pair of comparators, which may be provided with the same or different reference potentials at a first input, each have a second input alternatingly receiving different ones of first and second signals relating to the magnitude of a parameter to be controlled. The results of a first comparison, with a first parameter signal connected to the input of the first comparator and the second comparator receiving the remaining parameter signal, is commutated by comparator output circuitry to means for realizing the alebraic difference of the signals and for circuitry intermediately storing this difference. During a second sampling period, when the inputs are reversed, the algebraic difference means provides another set of signals to the intermediate storage means, which second set of signals have parametric changes of opposite duration and substantially equal magnitude to errors introduced by the comparators during the first sampling, such that the intermediately-stored algebraic difference of the two sample sets is substantially free of any effects due to input offset and other errors between the pair of comparators.

In one presently preferred embodiment, the comparator inputs are switched by a network comprising a quad of controlled bilaterally-conductive devices, with the comparator logic outputs being steered by an output logic network to increase or decrease charge stored in an intermediate-storage capacitive element to affect the voltage thereacross. The voltage across the intermediate-storage capacitance is coupled to other elements, to effect a desired action, only after both commutated comparator readings have been completed, to allow errors in the first set of comparator comparisons to be offset by substantially equal but opposite errors in the second (commutated) set of comparator commutated comparisons.

Accordingly, it is an object of the present invention to provide a novel improved dual-comparator discrete resistance comparison means in which errors induced by any input offset error between the comparators is substantially cancelled.

This and other objects of the present invention will become more apparent upon consideration of the following detailed description, when read in conjunction with the drawings.

BRIEF DESCRIPTION OF THE DRAWINGS

FIG. 3 is a set of waveforms found in germane portions of the circuit of FIG. 2 and useful in understanding certain aspects of operation of the improved resistance comparator means; and FIGS. 4 and 4A, 4B and 4C are time-coordinated sets of waveforms found in the improved dual-resistance-comparator, algebraic difference, and intermediate storage means of the present invention, respectively in the greater-than-desired resistance case, the less-than-desired resistance case and the desired resistance case, and useful in appreciating the principles of operation of the present invention.

DETAILED DESCRIPTION OF THE INVENTION

Figure 1:
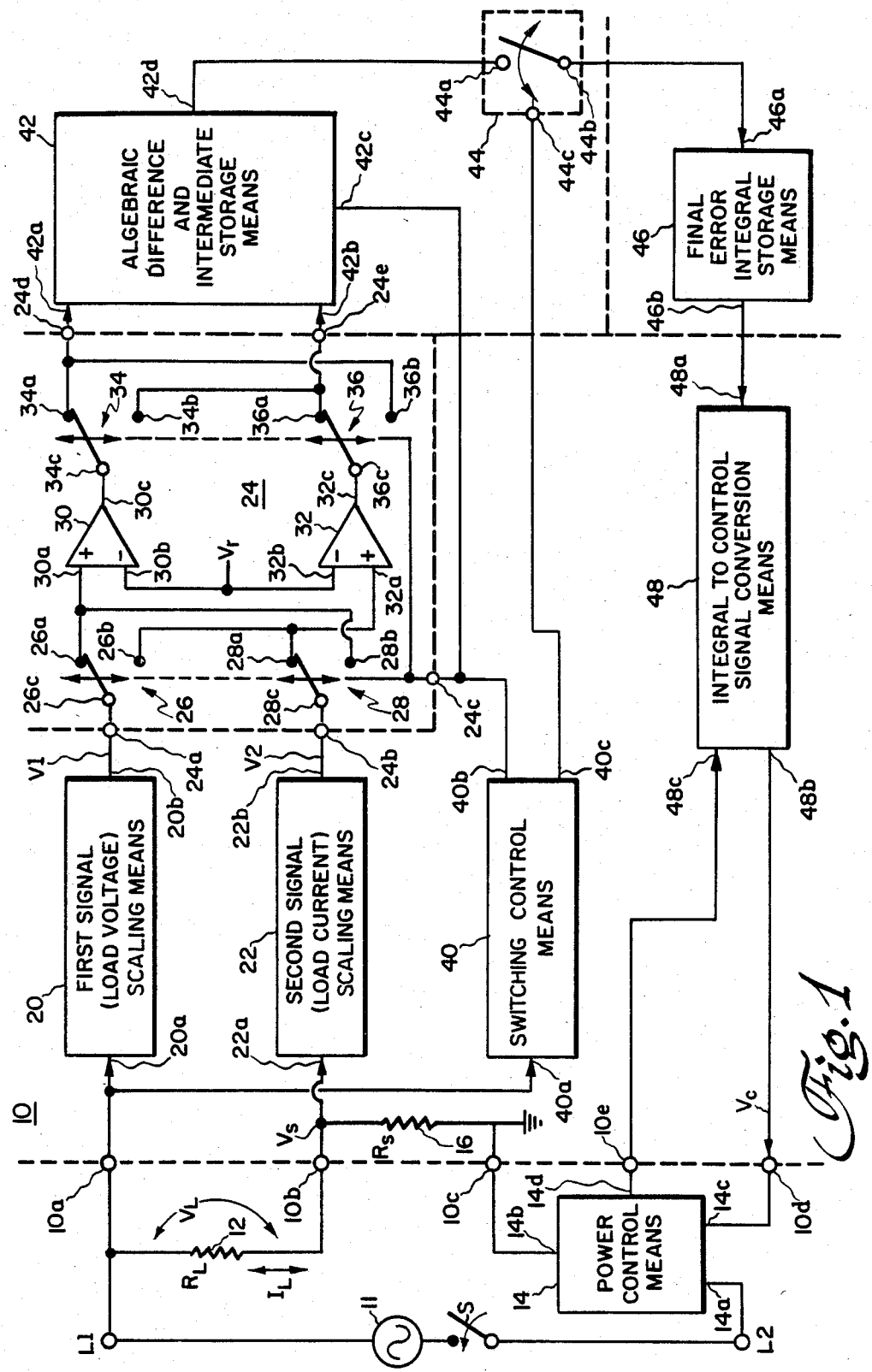
FIG. 1 is a schematic block diagram of circuitry, including the improved resistance comparison means of the present invention, for controlling the resistsance of a load, connected in series with the circuit and an A.C. source, to a desired load resistance magnitude.

Referring initially to FIG. 1, a control circuit 10 is utilized for controlling the flow of current from an A.C. source 11 through a load resistance 12, by proper energization and deenergization of a power control means 14 in series therewith, to adjust the load voltage $V_L$ and load current $I_L$ such that a desired magnitude of resistance $R_L$ is attained for the nonzero-temperature-coefficient load 12. Source 11 is connected, typically by closure of a switch S, between first and second line terminals $L_1$ and $L_2$. First load terminal $L_1$ is connected to a first terminal 10a of the control circuit, and to one terminal of load resistance 12. The remaining terminal of load 12 is connected to a second control circuit input 10b. A current sampling resistance 16, of resistance magnitude $R_S$, is connected within control circuit 10 between input 10b and a circuit common terminal 10c. Resistance 16 provides a sample voltage $V_s$ responsive to the instantaneous load current $I_L$ flowing through the load; thus, the instantaneous sample voltage magnitude $V_s = I_L R_S$. Power control means 14 has a line input 14a connected to second line terminal $L_2$ and a controlled line output 14b connected to circuit common terminal 10c. The connection between terminals 14a and 14b is controlled responsive to the magnitude of a control signal $V_C$ applied to a power control means control input 14c, from a control circuit terminal 10d. Thus, at a first value of control voltage $V_C$, e.g. a low (logic 0) level at input 14c, a first, smaller magnitude of current may be controlled to flow from source 11, through power control means 14, sampling resistance 16 and the load 12, and back to the source, and for a second value of control voltage $V_C$, e.g. a high (logic 1) level at input 14c, a second and greater magnitude of current may be controlled to flow from the source, through the power control means, sampling resistance and load resistance, and back to the source. It should be understood that power control means 14 may also operate by switching of the connection between line terminal $L_2$ and circuit input 10c between a substantially open-circuit condition and a substantially short-circuit condition, whereby current is turned substantially completely off and completely on, rather than merely changed in magnitude, responsive to the control $V_C$ signal level.

A first signal scaling means 20 has an input 20a connected to circuit terminal 10a, for scaling the first, or load voltage, signal for providing a first scaled voltage V1 at an output 20b thereof. A second signal scaling means 22 has an input 22a connected to circuit terminal 10b, for scaling the resistance 16 voltage $V_s$, which is proportional to the load current, whereby a second scaled voltage V2, proportional to load current $I_L$, is provided at the second signal scaling means output 22b. The first, load voltage, scaled signal V1 voltage is connected to a first input 24a of a comparator means 24, while the second, load current, scaled signal V2 voltage is connected to a second input 24b of the comparator means. In the aforementioned pair of co-pending applications, each individual input 24a or 24b, is independently connected to a different one of a pair of comparators.

In accordance with one aspect of the improved resistance comparator circuitry of the present invention, first and second signal input terminals 24a and 24b are respectively connected to first and second synchronized switching means 26 and 28, thence to comparators 30 and 32, and thence through a second pair of synchronized switching means 34 and 36, synchronized to the first pair of synchronized switching means 26 and 28, to a pair of comparator means output terminals 24d and 24e. Thus, a first terminal 26a of first switching means 26 is connected to a non-inverting +input 30a of the first comparator, which receives a reference $V_r$ voltage at an inverting −input 30b thereof. The second selectable terminal 26b of the first switching means is connected to a non-inverting +input 32a of second comparator 32, which has an inverting input 32b also receiving the reference $V_r$ voltage. The common terminal 26c of the first switching means is connected to comparator means input terminal 24a to receive the first scaled (load voltage) signal V1. The first selectable terminal 28a of the second switching means is connected, in parallel with first switching means second selectable terminal 26b, to second comparator input 32a, while second switching means second selectable terminal 28b is connected, in parallel with first switching means first selectable terminal 26a, to first comparator input 30a. The common terminal 28c of the second switching means is connected to comparator means second input terminal 24b for receiving the second scaled (load current) signal V2. A first selectable terminal 34a of first output switching means 34 is connected to first comparator means output terminal 24d, in parallel with the second selectable terminal 36b of the second output switching means 36. The second selectable terminal 34b of the first output switching means is connected, in parallel with the first selectable terminal 36a of the second output switching means 36, to second comparator output terminal 24e. The first output switching means common terminal 34c is connected to the first comparator output 30c, while the second output switching means common terminal 36c is connected to the output 32c of the second comparator. All of switching means 26, 28, 34 and 36 are synchronized to be in a first position (e.g. respectively connecting first input switching means common terminal 26c to first selectable terminal 26a, second input switching means common terminal 28c to first selectable terminal 28a thereof, first output switching means common terminal 34c to first selectable output 34a thereof and second output switching means common terminal 36c to first selectable terminal 36a thereof) responsive to receipt of a first level at comparator means switching control input 24c. Similarly, responsive to receipt of a different level at comparator means control input 24c, all of switching means 26, 28, 34 and 36 substantially simultaneously switch their respective common terminals 26c, 28c, 34c and 36c to connect to the respective switching means second terminals 26b, 28b, 34b, and 36b, respectively.

In accordance with another aspect of the present invention, the comparator means first output 24d is connected to a first input 42a of an algebraic difference and intermediate storage means 42, having a second input 42b connected to the comparator means second output 24e. Means 42 may have, as required, a control input 42c receiving the same sample control signal as received at comparator means input 24c. An intermediately-stored resistance control signal is provided at means output 42d, for connection to a first terminal 44a of a selectable connection means 44. First terminal 44a is connected to switch terminal 44b responsive to the state of the control signal at a control input 44c. This control signal is provided at one output 40c of a switching control means 40 which also provides the signal to comparator means input 24c at another output 40b, responsive to source voltage changes monitored at a switching control means input 40a. Responsive to the signal at switching control means output 40c, the signal at connection means input 44a is connected to the input 46a of a final error integral storage means 46. The final storage means output 46b provides a signal to the input 48a of an integral-to-control-signal conversion means 48. A conversion means output 48b provides the control $V_C$ signal voltage to circuit terminal 10d and thence to power control means control terminal 14c. Conversion means 48 advantageously possesses a second input 48c, receiving a signal from an output 14d of the power control means, via circuit terminal 10e, for determining the present condition of power control means 14.

In operation, circuit 10 provides the respective first (load voltage) scaled signal $V_1$ voltage and the second (load current) scaled signal $V_2$ voltage individually, but simultaneously, to the respective comparator means inputs 24a and 24b. During a first-polarity, e.g. the positive-polarity, half-cycle of a first cycle of the source 11 waveform, all of the comparator means switching means 26, 28, 34 and 36 are connected as shown, whereby first voltage $V_1$ is connected to the input of the first comparator 30 and second voltage $V_2$ is connected to the input of the second comparator 32. The results of the comparisons therein (against the reference voltage $V_r$) are provided at the first and second comparator outputs 30c and 32c, respectively, and are respectively coupled to the respective first and second inputs 42a and 42b of the algebraic difference and intermediate storage means 42. The storage of the first comparison results may be carried out responsive to a first signal state at sample control means output 40b. Any error, due to input offset or other factors, in either comparator 30 or 32 provides an error in the signal at one of comparator outputs 24d and 24e, with respect to the signal at the other output. In the next same-polarity, e.g. positive-polarity, half-cycle of the source 11 waveform, sample control means output 40b is switched to the opposite state, switching all of comparator means switching means 26, 28 34 and 36. Thus, first voltage $V_1$ is now connected to the input of second comparator 32, while second voltage $V_2$ is now connected to the input of first comparator 30; likewise, the output of first comparator 30 is connected to the second comparator means output 24e and the second comparator output 32c is connected to the first comparator output 24d. During the second cycle comparison, occurring in the next cycle after the first comparison, the effective comparator output error now appears at the opposite one of comparator means outputs 24e and 24d, with respect to the output at which the comparator error appeared during the first-cycle comparison. The algebraic difference of the comparisons, e.g. the times at which the comparator output 24d and 24e signals change state in both the first and second source waveform cycles, is taken in means 42 and is stored as an intermediate change in some physical quantity, e.g. the charge stored in a capacitor. Due to the reversal of comparator connections, any error in the first source waveform comparison results in a change in a first direction in the quantity stored in the intermediate storage element, which error is substantially compensated for by a change in an opposite direction in the stored quantity during the second source waveform comparison, when the input signals to the comparators are reversed. Thus, the signal at intermediate storage means output 42d is substantially proportional to the conditions of the first and second scaled signal voltages $V_1$ and $V_2$, and any comparator errors have substantially cancelled each other. Only after completion of the second source waveform cycle comparison and intermediate storage is sample control means second output 40c enabled, e.g. during the opposite-polarity (negative-polarity) half-cycle of the second source waveform, and switching means 44 closed, to transfer the intermediately-stored error signal to the final error integral storage means 46, for conversion to the control signal for introduction to power control means 14 and actual control of the load resistance current $I_L$.

Figure 2:
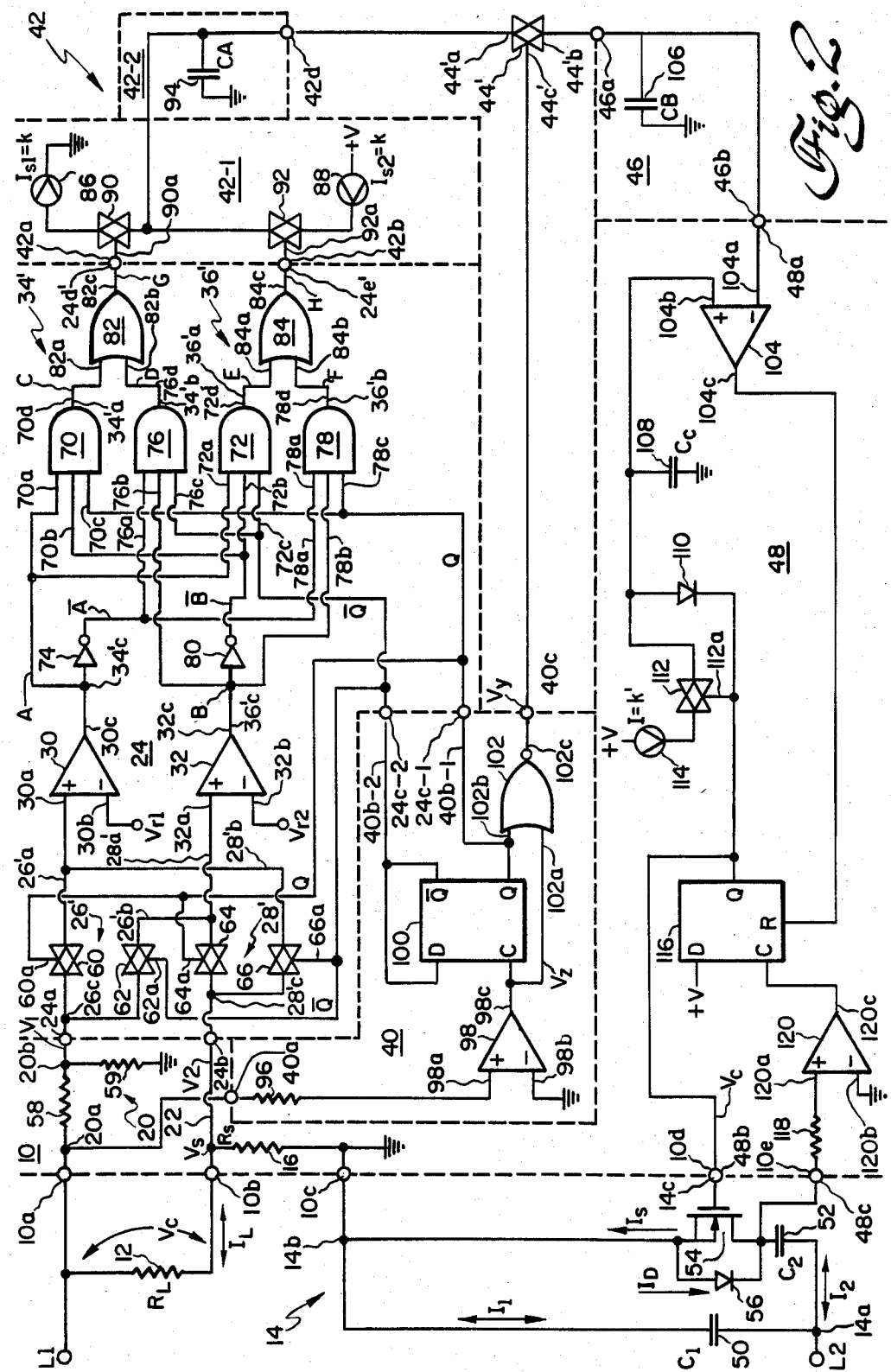
FIG. 2 is a schematic diagram of a presently preferred embodiment of the circuit of FIG. 1.

Referring now to FIG. 2, a presently preferred embodiment of the circuit 10 of FIG. 1 is utilized with a power control means 14 of the dynamic-switched-capacitor type, as more fully described and claimed in co-pending application Ser. No. 379,393, filed May 18, 1982 now U.S. Pat. No. 4,447,764, assigned to the assignee of the present application and incorporated herein by reference in its entirety. Briefly, power control means 14 comprises a first capacitor 50, of capacitive value $C_1$, permanently connected in series with the load, and an auxiliary capacitor 52, of capacitive magnitude $C_2$, selectively connected in shunt with main capacitor 50 by operation of either a power switching device 54 or a shunting diode 56. When both device 54 and diode 56 are non-conductive, current flows from source 11 through load 12 and sensing resistance 16 (of small, e.g. 0.05 ohms, resistance $R_S$) and through the capacitive reactance of main capacitor 50. Therefore, the main capacitor 50 capacitance $C_1$ establishes a minimum value of load resistance current $I_L$. When device 20 is placed in the current-conductive condition, an additional current $I_S$ is also the current $I_2$ which flows through auxiliary capacitor 52, dependent upon the capacitive value $C_2$ thereof, and the load current $I_L$ magnitude is the sum of the main and auxiliary capacitor currents, i.e. $I_L = I_1 + I_2$. If the voltage across the main and auxiliary capacitors 50 and 52 is such that diode 56 conducts, the diode current $I_D$ flows through an auxiliary capacitor 52 and also adds current $I_2$ to the main capacitor current $I_1$ to provide the total load current $I_L$. The load current, and therefore the load voltage, power, temperature and (for the required non-zero-temperature-coefficient resistive load) the load resistance itself, are all variably dependent upon the time interval during which each of switching device 54 or diode 56 is conductive. Diode 56 will conduct for a different portion of the source waveform, but for essentially the same time duration, as the source waveform portion in which device 54 conducts. Therefore, by controlling the conduction time interval of device 54, the lamp load voltage $V_L$ and lamp current $I_L$ are provided at desired levels to control the load resistance $R_L$ to a desired magnitude.

First signal scaling means 20 comprises a load voltage divider utilizing a series resistance 58 between first scaling means input 20a and output 20b and a second resistance element 59 connected from first scaling means output 20b to circuit common potential. A short-circuit connection is utilized herein for second signal scaling means 22, so that the second scaled voltage V2 is the sampled voltage $V_s$ provided across the sampling resistance 16. Advantageously, the first scaled voltage V1 magnitude is adjusted to be substantially equal to the $V_2 = V_s$ magnitude for the desired load resistance condition, whereby a single reference voltage source can be used in comparator means 24. If the scaling constant of first signal scaling means 20 cannot be, or is not for any reason, so adjusted, the first and second comparator second inputs 30b and 32b can be respectively connected to different reference potentials $V_{r1}$ and $V_{r2}$, respectively, as shown, with the understanding that the non-identical reference voltages must be alternately switched between the comparators, at the same time that the comparator input signals are switched.

In accordance with one aspect of the invention, comparison means 24 utilizes controlled bilaterally-conductive solid-state switching elements 60, 62, 64 and 66 to implement the first and second input switching means 26' and 28'. One terminal of the controlled-conduction circuit of each of bilateral devices 60 and 62 is connected to junction 26'c, itself connected to the first comparator means input terminal 24a, while one terminal of each of bilateral devices 64 and 66 is connected to junction 28'c, itself connected to second comparator input terminal 24b. The remaining conductive circuit terminals of bilateral devices 60 and 66, being equivalent to first input switching means first selectable terminal 26'a, and second input switching means second selectable terminal 28'b, are connected in parallel to first comparator input 30a. The remaining terminal of the controlled-conduction circuit of each of bilateral devices 62 and 64, respectively forming the first input switching means second selectable terminal 26'b and the second input switching means first selectable terminal 28'a, are connected in parallel to second comparator input 32a. Each of bilateral devices 60, 62, 64 and 66 has an associated control input 60a, 62a, 64a and 66a. To provide the proper commutated switching action, the control inputs 60a and 64a are connected in parallel to a first comparator means switching input 24c-1, while the control inputs 62a and 66a of the remaining two devices are connected in parallel to a second comparator means control input 24c-2. All four of the controlled bilaterally-conductive devices 60, 62, 64 and 66, are commonly available in a single integrated circuit package.

In the illustrated presently preferred embodiment, since the signals at first and second comparator outputs 30c and 32c, respectively, are of a digital nature, i.e. changing from a first level to a second level, and vice versa, dependent upon whether the voltage at the comparator non-inverting input is greater than, or less than, the reference voltage at the comparator second input, it is not necessary to utilize output switching means 34 and 36 which are capable of preserving exact analog voltage magnitudes. Accordingly, the comparator digital output 30c and 32c signals are switched to the appropriate ones of comparator means outputs 24d and 24e by means of first and second digital switching networks 34' and 36'. The first comparator digital output signal A is provided to a first input 70a of a first 3-input AND gate 70 and to a first input 72a of a second 3-input AND gate 72. The first comparator output signal A is also applied to the input of a first logic inverter means 74, and the inverted first comparator means output signal $\overline{A}$ at the first inverter output is supplied to a first input 76a of a third 3-input AND gate 76 and to a first input 78a of a fourth 3-input AND gate 78. The second comparator digital output signal B is applied to a second input 76b of third AND gate 76 and to a second input 78b of fourth AND gate 78. The second comparator means output 36'c logic signal B is also applied to a second inverter means 80, at the output of which appears the second comparator means output inverted signal $\overline{B}$. The $\overline{B}$ signal is supplied to a second input 70b of first AND gate 70 and to a second input 72b of second AND gate 72. The Q signal, which enables input bilateral transmission devices 60 and 64, is connected to the remaining input 70c of the first AND gate and to the remaining input 78c of the fourth AND gate. The complementary $\overline{Q}$ signal, which enables input bilateral transmission devices 62 and 66, is applied to the remaining input 72c of the second AND gate and remaining input 76c of the third AND gate. The first output switching means first selectable terminal 34'a signal C is provided at the first AND gate output 70d, while the first output switching means second selectable terminal 34'b signal D is provided at the third AND gate output 76d. The second output switching means first selectable terminal 36'a signal E is provided at the second AND gate output 72d and the second output switching means second selectable terminal 36'b output signal F is provided at the fourth AND gate output 78d. To provide the proper digital logic signals G and H, respectively, at the respective comparison means first and second output terminals 24d and 24e, a pair of 2-input OR gates 82 and 84 are utilized. The first gate output C signal is connected to a first input 82a of the first OR gate, while the third gate output signal D is connected to the second input 82b thereof, with the OR gate output 82c providing a first intermediate output terminal 24'd signal G. Similarly, the second gate output signal E is provided to a first input 84a of the second OR gate, having its second input 84b receiving the signal F from the fourth gate, and having its output 84c providing a second intermediate output signal H to a second intermediate output terminal 24e'.

In accordance with another aspect of the present invention, in the illustrated embodiment, portions of the comparator output switching means 34 and 36 and a portion of the algebraic difference means 42 (of FIG. 1)

are combined in the digital networks 34' and 36' (each comprised of an inverter 74 or 80 and three gates 70, 76 and 82 or 72, 78 and 84), whereby an algebraic difference means subportion 42-1 is used with an intermediate storage means 42-2 and the digital networks 34' and 36', to realize a cost-effective combination of switching means 34 and 36 and the algebraic difference means portion of FIG. 1. Algebraic difference means subportion 42-1 utilizes a pair of constant-current sources 86 and 88, each associated with a controlled, bilaterally-conductive switching device 90 and 92, respectively, for supplying charge to, and removing charge from, an inter-mediate storage means 42-2 capacitive storage element 94, of capacitive magnitude CA. Intermediate storage element 94 is connected between ground potential and the means output terminal 42$d$. The storage element voltage, and therefore the means output 42$d$ terminal voltage, is decreased by conduction of first bilaterally-conductive device 90 responsive to a high (logic 1) level signal at the control input 90$a$ thereof; as control input 90$a$ is connected to the algebraic difference means subportion and thence to comparator first intermediate output 24$d'$ then whenever the comparator first output signal G is at a logic 1 level, device 90 conducts, connecting current source 86 between means output terminal 42$d$ and ground potential, such that the substantially constant current $I_{s1}$ removes charge at a substantially-constant rate from intermediate storage capacitive element 94. Conversely, the voltage across capacitor 94, and at means output terminal 42$d$, is increased by conduction of device 92, responsive to a high (logic 1) level at the control input 92$a$. Control input 92$a$ is connected to the algebraic difference means subportion and to the second comparator means intermediate output 24$e'$ so that whenever the second comparator means second output signal H is a logic 1 level, device 92 is controlled to the conductive condition, allowing a substantially-constant current $I_{s2}$ of current source 88 to flow from positive potential, through device 92, and add charge at a substantially-constant rate to capacitive element 94, increasing the voltage thereacross. Since signals G and H are responsive to the relative times at which V1 and V2 reach the comparator reference voltage, the total charge change, and therefore, the change in output 42$d$ voltage, is responsive to the deviation of the load resistance $R_L$ from the desired value therefore, as established by the reference voltage values and the scaled signals V1 and V2. It will be seen that, in the illustrated preferred embodiment, the algebraic difference means subportion receives a pair of sample control signals in the form of the Q and $\overline{Q}$ signals to gates 70, 72, 76 and 78. Switching device 44 comprises another controlled bidirectionally-conductive switching device, having its controlled conductive channel terminals connected to switching means terminals 44'$a$ and 44'$b$. Device 44' conducts responsive to a high (logic 1) level at a control input 44'$c$, as applied by the voltage $V_y$ at switching control means second output 40$c$.

Switching control means 40, for providing the switch control signal $V_y$ at second output 40$c$ and for providing the complementary Q and $\overline{Q}$ comparator means switching signals at outputs 40$b$-1 and 40$b$-2 (for connection to the associated one of comparator means control inputs 24$c$-1 and 24$c$-2) receives the line $L_1$ voltage at the input 40$a$ thereof. Input 40$a$ is coupled through a current-limiting resistance 96 to the non-inverting+input 98$a$ of a comparator 98, having its inverting−input 98$b$ connected to circuit common potential. Comparator output 98$c$ thus provides a voltage $V_z$ which is at a high (logic 1) level whenever the line 1-to-circuit common voltage is positive, i.e. during each positive-polarity half-cycle of the source waveform, and is at a low (logic 0) level during each negative-polarity source waveform half-cycle. The signal $V_z$ voltage is connected to a clock C input of a D-type flip-flop 100 and to a first input 102$a$ of a NOR gate 102. The Q output of flip-flop logic element 100 is connected to the first switching control means output 40$b$-1 and also to the remaining input 102$b$ of the NOR gate. The complementary $\overline{Q}$ output of the flip-flop is connected both to the data D input thereof, for divide-by-two toggling, and to the second sample control means output 40$b$-2. The NOR gate output 103 is connected to switching control means output 40$c$ to provide the $V_y$ signal for enabling switching means 44'.

Final error integral storage means 46 utilizes another storage element, which is a capacitor 106 (having a capacitive magnitude CB) connected between input first output terminals 46$a$/46$b$ and circuit common potential.

Integral-to-control-signal conversion means 48 comprises a comparator 104 having an invertinng−input 104$a$ connected to the integral storage means input 48$a$ and the final error integral storage means output 46$b$. The non-inverting+input 104$b$ of the comparator is connected to: one terminal of another integrating capacitance 108, of magnitude CC, which has its remaining terminal connected to ground potential; to the anode of a unidirectionally-conductive device 110, e.g. a diode; and to one conductive circuit terminal of another controlled bidirectionally-conductive switching element 112. The remaining conductive circuit terminal of bidirectional element 112 is connected to the output of a current source 114, providing a substantially constant current ($I = k'$) from the positive operating potential $+V$ source. The controlled device control input 112$a$ is connected to the cathode of diode 110, to the Q output of another flip-flop logic elemennt 116 and to the conversion means output 48$b$.

Flip-flop 116 receives the comparator output 104$c$ signal at its reset R input. The data D input of this flip-flop is connected to a high (logic 1) level signal, such as the positive operative potential $+V$. The flip-flop 116 Q output, at signal conversion means output 48$b$ and circuit terminal 10$d$, is connected connection to power control means input 14$c$, e.g. at the gate of a power MOSFET control device 54. The drain voltage of device 54 is coupled to circuit terminal 10$e$ and thence to signal conversion means input 48$c$. This voltage is coupled through a current-limiting series resistance 118 to the non-inverting+input 120$a$ of another comparator 120, having its inverting−input 120$b$ connected to circuit common potential, and its output 120$c$ connected to the clock C input of flip-flop 116.

Operation of the resistance control circuit 10 with the improved switch comparator will be described for the circuit of FIG. 2, and with particular reference to the signal waveforms of FIGS. 3, 4 and 4A-4C. The basic operation of circuit 10 is described for equal comparator reference voltages $V_{r1}$ and $V_{r2}$. This operation, at whatever chosen ratio of reference voltage, and therefore of input signals V1 and V2, occurs during two successive cycles of the source AC waveform 130 (FIG. 3, waveform a). At the beginning of the first cycle, the first positive-going zero crossing provides a rising edge 131 in the $V_z$ signal waveform at comparator output 98$c$.

The comparator output stays at the logic 1 level in portion 132a, until the next subsequent negative-going zero crossing, when the comparator output switches to a logic 0 level, in portion 132b, and remains thereat until the end of the first cycle. Responsive to the positive-going zero crossing at the beginning of the second source waveform cycle, rising edge 131' occurs and the comparator output remains at the logic 1 level, in portion 132a', until the negative-going zero crossing of the second cycle, at which time the comparator output falls to a logic 0 level, in portion 132b', and remains thereat until the end of the second cycle. Responsive to each of rising edges 131 and 131' appearing at the clock C input of flip-flop 100, the $\overline{Q}$ and Q outputs thereof reverse (FIG. 3, waveforms b and c, respectively). Thus, at time $t_{01}+$, the first cycle rising edge 131 provides a Q output logic 1 level 134a and a $\overline{Q}$ output logic 0 level 136a; these levels remain until the next rising edge 131 at time $t_{02}+$, when the Q output voltage falls to a logic 0 level 134b and the $\overline{Q}$ voltage rises to a logic 1 level 136b. These levels are maintained until the start of the next double-cycle sequence, at time $t_{01'}+$ when the sequence repeats. The switch-control $V_y$ voltage (FIG. 3, waveform d) is at a logic 0 level 138a during the first three half-cycles of the sequence, as one of the comparator output $V_z$ voltage and the flip-flop Q voltage are at a logic 1 level thereat; it is only in the fourth half-cycle, between time $t_{02}-$ and time $t_{01'}+$, that the signal at gate output 102c changes to a logic 1 level 138b and enables conduction through switch means 44'.

Figure 4A:
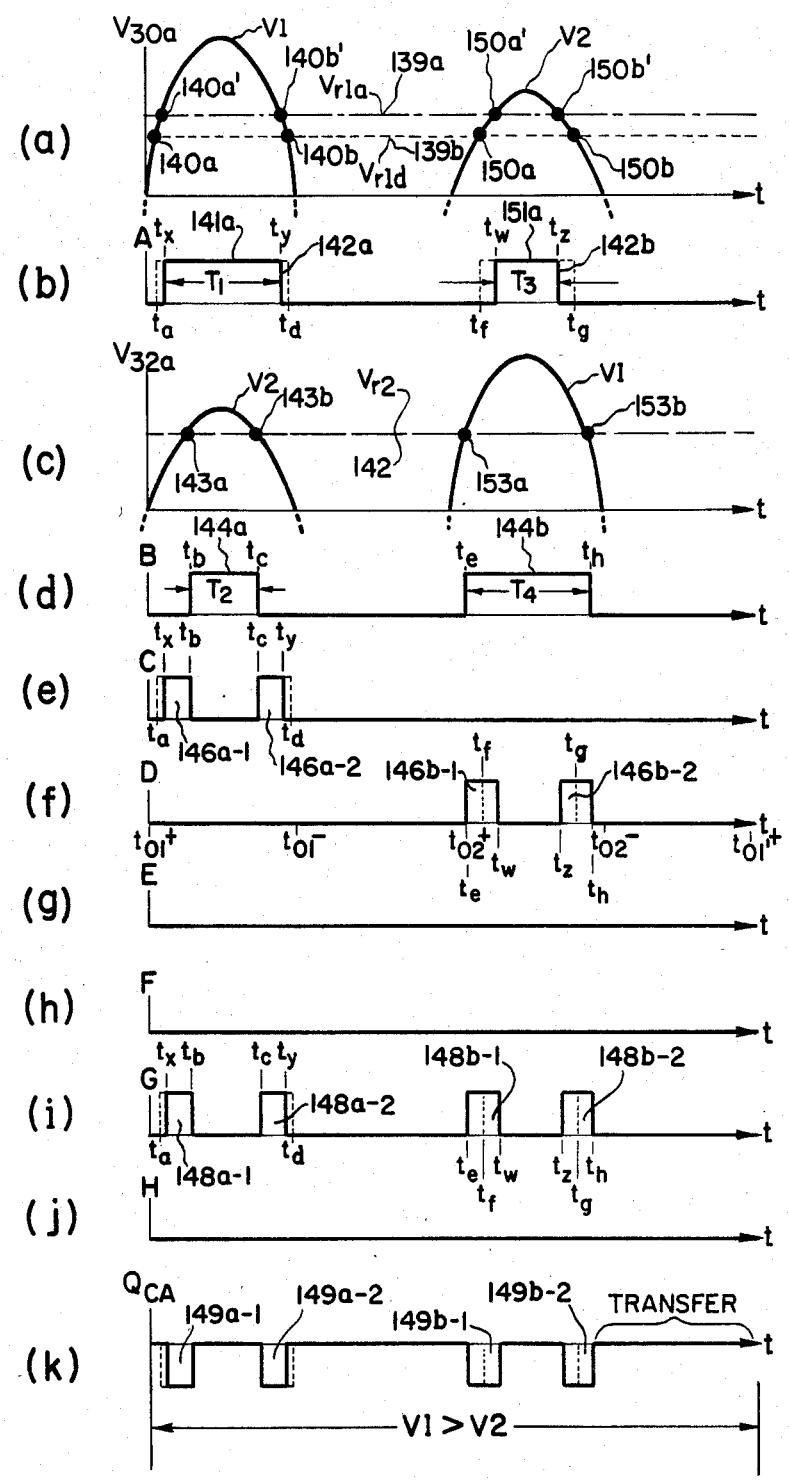

The waveforms of FIG. 4A illustrate the operation of circuit 10 with a greater-than-normal load resistance $R_L$, wherein the load voltage scaled signal V1 is greater than the load current scaled signal V2, for a double source-waveform cycle interval, i.e. between time $t_{01}+$ and time $t_{01'}+$. During the first positive-polarity source waveform half-cycle (from time $t_{01}+$ to time $t_{01}-$), the scaled load voltage V1 is applied to the first comparator input 30a (FIG. 4A, waveform a) while the scaled load current sample voltage V2 is applied to the second comparator input 32a (FIG. 4A, waveform c). Each of the V1 and V2 waveforms are compared, in respective comparators 30 and 32, against respective voltage levels $V_{r1}$ and $V_{r2}$. It is assumed, for purposes of explanation in all illustrated cases, that all input errors occur in the first comparator, such that the desired reference voltage $V_{r1d}$ level 138b is shifted to a higher, actual reference voltage $V_{r1a}$ magnitude 139a. It will be seen that the operations to be described hereinafter will be similar if either the second comparator reference voltage $V_{r2}$ increases undesirably, or if either comparator voltage decreases undesirably. Due to the increased effective reference voltage $V_{r1a}$, the first comparator output voltage A (FIG. 4A, waveform b) rises from its normal logic 0 level to a logic 1 level 141a at a time $t_x$ corresponding to the time point 140a' when the voltage waveform V1 crosses the actual $V_{r1a}$ reference level, rather than the somewhat earlier time $t_a$ when waveform V1 should have crossed the desired reference voltage level $V_{r1d}$ at time point 140a. Similarly, the logic 1 level 141a of the voltage A waveform falls back to the logic 0 level at a time $t_y$ corresponding to the point 140b' when the signal V1 waveform crosses the actual reference line 139a, earlier than the desired time point 140b for crossing the desired reference line 139b which should occur at the somewhat later time $t_d$. Thus, the duration $T_1$ of the first comparator output voltage A pulse 142a is shorter than expected by an amount $((t_x-t_a)+(t_d-t_y))$. During the same positive-polarity source waveform half-cycle, the second scaled voltage V2 waveform crosses the desired second comparator reference line 142 at the expected points 143a and 143b (FIG. 4A, waveform c) generating a second comparator output B voltage logic 1 pulse 144a (FIG. 4A, waveform d) which rises to the logic 1 level at time $t_b$ and falls therefrom at time $t_c$ and provides a pulse of duration $T_2$.

Because of the state of the Q and $\overline{Q}$ signals from flip-flop 100, only the first AND gate 70 output is affected; this gate output voltage C (FIG. 4A, waveform e) provides a first pulse 146a-1 rising to the logic 1 level at time $t_x$ (instead of the desired earlier time $t_a$) and falling to the logic 0 level at time $t_b$, and provides a second pulse 146a-2 rising to the logic 1 level at time $t_c$ and falling back to the logic 0 level at time $t_y$ (rather than the desired later time $t_d$). It will be seen that the third, second and fourth gate outputs D, E and F, respectively (FIG. 4A, waveforms f, g and h, respectively) remain at the logic 0 level. It will also be seen that the C output is transmitted through gate 82 and appears as signal G pulses 148a-1 and 148a-2 (FIG. 4A, waveform i) with the same time relationship as the signal C pulses. Since both the E and F signals remain at the logic 0 level, the second comparator output signal H (FIG. 4A, waveform i) remains at the logic 0 level. Responsive to each of pulses 148a-1 and 148a-2, gate 90 is opened and the charge $Q_{CA}$ on capacitor 94 is reduced as current flows therefrom, through source 86 to ground potential. The amount of charge removed is indicated by the charge-depletion pulses 150a-1 and 150a-2 (FIG. 4A, waveform k) which are of lesser duration, by the amount $((t_y-t_a)+(t_d-t_y))$, than the desired duration (indicated by the broken-line desired leading and trailing edges of the first and second pulses, respectively) which would have been provided if there were no input error in either comparator. It will be seen that no action occurs during the negative-polarity half-cycle of the first source waveform, i.e. from time $t_{01}-$ to time $t_{02}+$. If the voltage across intermediate storage capacitor 94 were to be transferred to final error integral storage means 46 at this time, the effect of comparator input error would result in a lesser decrease in voltage than should have occurred, due to the less-than-expected widths of pulses 150a-1 and 150a-2. This is corrected during the positive-polarity half-cycle of the second source waveform, from time $t_{02}+$ to time $t_{02}-$.

During this second time interval of interest, the Q and $\overline{Q}$ outputs of flip-flop 100 have reversed, causing switching elements 62 and 66 to conduct, instead of the elements 60 and 64 conducting during the first source waveform positive-polarity half-cycle, whereby the load voltage scaled V1 waveform is applied to second comparator input 32a and the current sampling signal V2 waveform is applied to first comparator input 30a. The second comparator output voltage B signal forms a pulse 144b which properly commences at time $t_e$ at the point 153a where the voltage V1 waveform is equal to the desired reference level 142, to provide a logic 1 pulse of time duration $T_4$ ending at time $t_h$ and coincident with point 153b when the falling sinusoidal voltage V1 waveform is again equal to the desired reference 142. However, the V2 waveform provides a first comparator output A voltage pulse 142b of a duration $T_3$ which is less than the desired duration, by an amount $((t_w-t_f)+(t_g-t_z))$, because the rising portion of the signal V2 waveform reaches the actual reference voltage line 139a at point 150a' (at time $t_w$) instead of the earlier time $t_f$ at which the rising waveform would have reached point 150a at the desired reference level line 139b. Similarly, the logic 1 level 154a portion ends and pulse 142b terminates at an actual time $t_z$ coincident with the falling portion of the V2 waveform reaching point 150b' at the actual reference voltage line 139a, which is less than the desired termination time $t_g$ at which the pulse would have ended when the falling V2 waveform crossed the desired reference voltage line 139b at point 150b. Thus, the first, second and fourth AND gate output signals C, E and F remain at the logic 0 level (FIG. 4A, waveforms e, g and h) and the second gate output signal D (FIG. 4A, waveform f) contains a pair of overly-long pulses 146b-1 and 146b-2. That is, pulse 146b-1 has properly commenced at time $t_d$ but (instead of terminating at the proper time $t_f$) terminates at a later time $t_w$ and pulse 146b-2, while terminating at the proper time $t_h$, has commenced at an earlier-than-expected time $t_z$ instead of the desired time $t_g$. The output D pulses are transferred through OR gate 82 as the G pulses 148b-1 and 148b-2 (waveform i), which are both of increased duration. These pulses provide charge-depletion pulses 149b-1 and 149b-2 (waveform l) which are of a larger duration than the desired charge-withdrawal pulses. The additional duration of pulses 149b-1 and 149b-2 is greater than the lessened duration of previous-cycle charge-depletion pulses 149a-1 and 149a-2, with respect to the desired charge-depletion pulse durations expected. Thus, the total charge withdrawn from capacitor 94 during the entire two source-waveform-cycle-interval is the sum of pulses 149a-1, 149a-2, 149b-1 and 149b-2 and is somewhat greater than expected, due to comparator errors, i.e. the less-than-expected intervals of pulses 149a are overcompensated for by the greater-than-expected durations of the pulses 149b, and the total charge withdrawn from capacitor 94 is slightly greater than the charge which would have been withdrawn if there were no comparator input errors.

At the beginning of the negative-polarity half-cycle of the second source waveform in the sequence, i.e. from time $t_{02}-$ to time $t_{01'}+$, a known portion of the net change of the charge stored in capacitor 94 is transferred to capacitor 106, by closure of switch means 44' responsive to the signal $V_y$ logic 1 level 138b; the ratio of the magnitudes CA and CB of respective capacitors 94 and 106 affect system loop gain and provide a means for realizing various response speeds for different uses.

During this source waveform half-cycle, the voltage at line terminal L2, with respect to common circuit potential, is positive as is the potential at the control device 54 drain electrode and at circuit terminal 10e. Responsive to this positive potential at input 48c, comparator output 120c rises to a high, logic 1, level and clocks a high, logic 1 level to the clock C input of second flip-flop 116. The flip-flop Q output is enabled to a high, logic 1, level and, in addition to biasing device 54 into conduction, reverse-biases diode 110 and control bilateral device 112 into conduction. The charge on capacitor 108 had previously been substantially depleted, through forward-biased diode 110 to circuit common potential, when flip-flop Q output was at a low, logic 0, level. Now, the charge in capacitor 108 increases as current from source 114 flows thereto; the voltage across capacitor 108 now substantially linearly increases. At a time when the magnitude of the voltage ramp at comparator input 104b equals the magnitude of the voltage provided at capacitor 106 at comparator input 104a, the comparator output 104c level rises from the normally-low (logic 0) level to a high, logic 1, level and resets the flip-flop Q output to the low (logic 0) level. The low Q output level turns off device 54 and also forward-biases diode 110 to reset the voltage across capacitor 108. The time interval required for the resetting of flip-flop 116 (and therefore the interval during which device 54 conducts a higher magnitude of load current $I_L$) is determined by the voltage across capacitor 108, which is itself controlled by the comparison of the V1 and V2 voltage at the comparison means inputs. If voltage V1 is greater than voltage V2, as in the illustrated case, the voltage across capacitor 106 is reduced, resulting in a reduced conduction time for device 54 and a decreased load R.M.S. current; load resistance is also reduced thereby, such that, over a series of double-source-waveform-cycle sets, the load resistance is controlled to the desired magnitude, where scaled voltage V1 is equal to the scaled sampled-load-current voltage V2. In fact, the overcompensation provided by pulses 149a being of greater-than-desired duration by more than the duration pulses 149a are of less-than-desired duration, causes the load current to change at a faster rate, in the desired (decreasing) direction, and provides a faster return to the desired load resistance operating point.

Figure 4B:
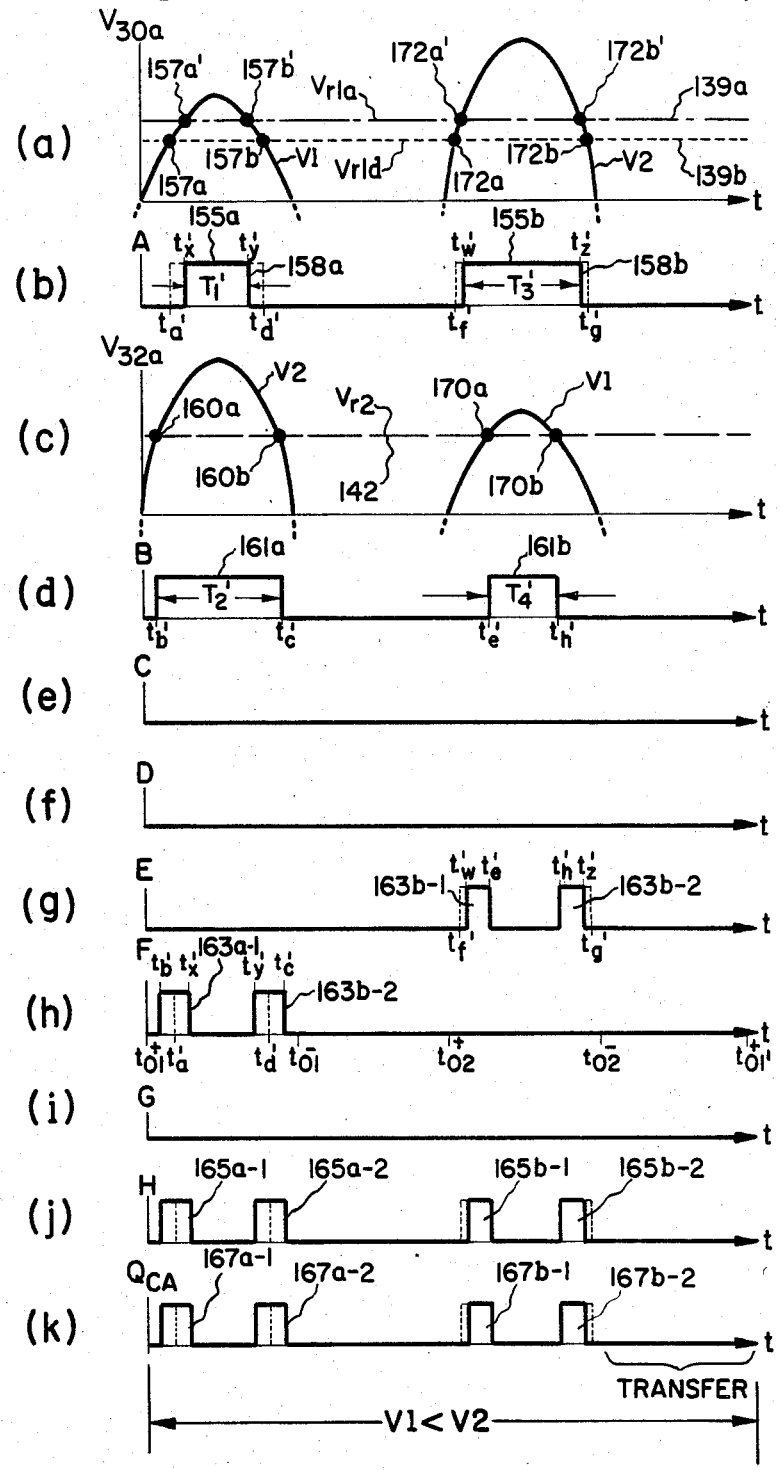

The waveforms of FIG. 4B illustrate the operation of circuit 10 with a less-than-normal load resistance $R_L$, wherein the load voltage scaled signal V1 is less than the load current scaled signal V2, for double-source-waveform-cycle time interval, i.e. between time $t_{01}+$ and time $t_{01'}+$. During the first positive-polarity source waveform half-cycle (from time $t_{01}+$ to time $t_{01}-$), the scaled load voltage V1 is again applied to the first comparator input 30a (FIG. 4B, waveform a) while the scaled load-current-sample voltage V2 is applied to the second comparator input 32a (FIG. 4B, waveform c). Again, each of the V1 and V2 waveforms are compared, in the respective comparators 30 and 32, against respective voltage levels $V_{r1}$ and $V_{r2}$. The actual reference value $V_{r1a}$ magnitude 139a is again assumed to have increased, with respect to the desired reference voltage $V_{r1d}$ level 139b thereof. Therefore, the first comparator output voltage A (FIG. 4B, waveform b) rises from its normal logic 0 level to a logic 1 level 155a at a time $t_x'$ corresponding to the time point 157a' when the voltage waveform V1 crosses the actual $V_{r1a}$ reference level, rather than at earlier time $t_a'$ when waveform V1 should have crossed the desired reference voltage level $V_{r1d}$ at time point 157a. Similarly, the logic 1 level 155a of the voltage A waveform falls back to the logic 0 level at a time $t_y'$ corresponding to the time point 157d' when the signal V1 waveform crosses the actual reference line 139a, earlier than the desired time point 157b for crossing the desired reference line 139d, which should occur at the somewhat later time $t_d'$. Thus, duration $T_1'$ of the first comparator output voltage A pulse 158a is shorter than expected by an amount $((t_x'-t_a')+(t_d'-t_y'))$. During the same positive-polarity source waveform half-cycle, the second scaled voltage V2 waveform crosses the desired second comparator reference line 142 at the expected points 160a and 160b (FIG. 4B, waveform c), generating a second comparator output B voltage logic 1 pulse 161a (FIG. 4B, waveform d) which rises to the logic 1 level at time $t_b'$ and falls therefrom at time $t_c'$ and provides a pulse of duration $T_2'$.

Because of the state of the Q and $\overline{Q}$ signals from the flip-flop 100, only the fourth AND gate 78 output is affected; this gate output voltage F (FIG. 4B, waveform h) provides a first pulse 163a-1 rising to the logic 1 level at time $t_b'$ and falling to the logic 0 level at time $t_x'$ (instead of the desired earlier time $t_a'$) and also provides a second pulse 163a-2 rising to the logic 1 level at time $t_y'$ (rather than the desired later time $t_d'$) and falling back to the logic 0 level at time $t_c'$. It will be seen that the first, second and third gate outputs C, D and E, respectively (FIG. 4B, waveforms e, f and g, respectively) remain at the logic 0 level. It will also be seen that the F output is transmitted through gate 84 and appears as signal H pulses 165a-1 and 165a-2 (FIG. 4B, waveform j) with the same time relationship as the signal F pulses. Since both the C and D signals remain at the logic 0 level, the first comparator output signal G (FIG. 4B, waveform i) remains at the logic 0 level. Responsive to each of pulses 156a-1 and 165a-2, gate 92 conducts and the charge $Q_{CA}$ in capacitor 94 is increased as current flows thereto, through source 88, from operating potential +V. The amount of charge added is indicated by the charge-addition pulses 167a-1 and 167a-2 (FIG. 4B, waveform k), which are each of greater duration, by the amount $((t_x'-t_a')+(t_d'-t_y'))$, than the desired duration (indicated by the broken-line desired trailing and leading edges of the first and second pulses, respectively) as would be provided if there were no input error in either comparator. Again, no action occurs in the comparator means or algebraic difference and intermediate storage means during the negative-polarity half-cycle of either the first or second source waveforms, although, as in all examples, the toggling of the Q output of flip-flop 116, in conversion means 48, and conduction timing of the power control means additional current flow (responsive to the voltages stored across capacitance 106) occurs during each of these negative-polarity half-cycles.

The additional voltage across intermediate storage capacitor 94 is at least partially corrected during the positive-polarity half-cycle of the second source waveform, from time $t_{02}'$ to time $t_{02}^{-}$. During this second time interval of interest, the Q and $\overline{Q}$ outputs of flip-flop 100 have reversed to cause switching elements 62 and 66 to conduct, whereby the load voltage scaled V1 waveform is applied to the second comparator input 32a and the current sampling signal V2 waveform is applied to the first comparator input 30a. The second comparator output voltage B signal forms a pulse 161b which commences at time $t_e'$ at the point 170a where the voltage V1 waveform is equal to the desired reference level 142, to provide a logic 1 pulse of time duration $T_4'$ ending at time $t_h'$ and coincident with point 170b when the falling sinusoidal voltage V1 waveform is again equal to the desired reference level 142. However, the V2 waveform provides a first comparator output A voltage pulse 158b of a duration $T_3'$ which is less than the desired duration, by an amount $((t_w'-t_f')+(t_y'-t_z'))$, because the rising portion of the signal V2 waveform reaches the actual reference voltage line 139a at point 172a' (at time $t_w'$) instead of the earlier time $t_f'$ at which the rising waveform would have reached point 172a at the desired reference level line 139b. Similarly, the logic 1 level 155b portion ends and pulse 158b terminates at an actual time $t_z'$ coincident with the falling edge of the V2 waveform reaching point 172b' at the actual reference voltage line 139a, which is less than the desired termination time $t_g'$ at which the pulse would have ended when the falling V2 waveform crossed the desired reference voltage line 139b at point 172b.

The first, second and fourth AND gate output signals C, D and F remain at the logic 0 level (FIG. 4B, waveforms e, f and h) and the third gate output signal E (FIG. 4B, waveform g) contains a pair of shorter-than-expected pulses 163b-1 and 163b-2. That is, pulse 163b-1 properly terminates at time $t_e'$ but commences at the later time $t_w'$ instead of commencing at the proper time $t_f'$. Pulse 163b-2 commences at the proper time $t_h'$ but terminates at an earlier-than-expected time $t_z'$ instead of the desired time $t_g'$. The output E pulses are transferred through OR gate 84 as the H signal pulses 165b-1 and 165b-2 (waveform j), which are both of shorter-than-expected duration. These pulses provide charge-addition pulses 167b-1 and 167b-2 (waveform k) which are of a shorter duration than the desired charge-addition pulses. The additional duration of previous-cycle charge-addition pulses 167a-1 and 167a-2 is greater than the lessened duration of charge-addition pulses 167b-1 and 167b-2, with respect to the desired charge-addition pulse durations expected. Thus, the total charge added to capacitance 94 during the entire two source-waveform-cycle-time interval is the sum of pulses 167a-1, 167a-2, 167b-1 and 167b-2 and is somewhat greater than expected, due to comparator errors, i.e. the less-than-expected intervals of pulses 167b undercompensate for the greater-than-expected durations of pulses 167a, and the total charge added to capacitor 94 is slightly greater than the charge which would have been added if there were no comparator input errors.

At the beginning of the negative-polarity half-cycle of the second source waveform in the sequence, i.e. from time $t_{02}^{-}$ to time $t_{01}'^{+}$, the known portion of the net change of the charge stored in capacitor 94 is, by closure of switch means 44', again transferred to capacitor 106. During the portions of the cycle when there is a negative-polarity voltage at line terminal $L_1$, but a positive-polarity potential at line terminal $L_2$, both with respect to circuit common, the voltage across capacitor 108 again ramps up and determines the interval during which the Q output of flip-flop 116 is set at a high (logic 1) level and therefore the conduction interval of device 54 in power control means 14. Since the voltage across capacitor 106 is increased, during the next double-source-waveform time interval a longer ramping interval is required before the flip-flop is reset and device 54 current flow is terminated, for each current conduction interval thereof; this action results in an increased R.M.S. load current. Load resistance is simultaneously increased whereby, over a series of double-source-waveform-cycle intervals and, due to the non-zero-temperature-coefficient of load resistance 12, the load resistance is controlled to the desired magnitude, where scaled voltage V1 is in the same proportion to the scaled sampled-load-current voltage V2 as the ratio of the comparator reference voltages $V_{r1}/V_{r2}$ (and V1=V2 if the same single reference voltage is applied to both comparators 30 and 32, as illustrated). Again, the undercompensation provided by pulses 167b being of less-than-desired duration by more than pulses 167a are of greater-than-desired duration, causes the load current to change at a faster rate, in the desired (increasing) direction, and provides the same faster return to the desired load resistance operating point as provided by the pulse overcompensation in the previous case of FIG. 4A.

Figure 4C:
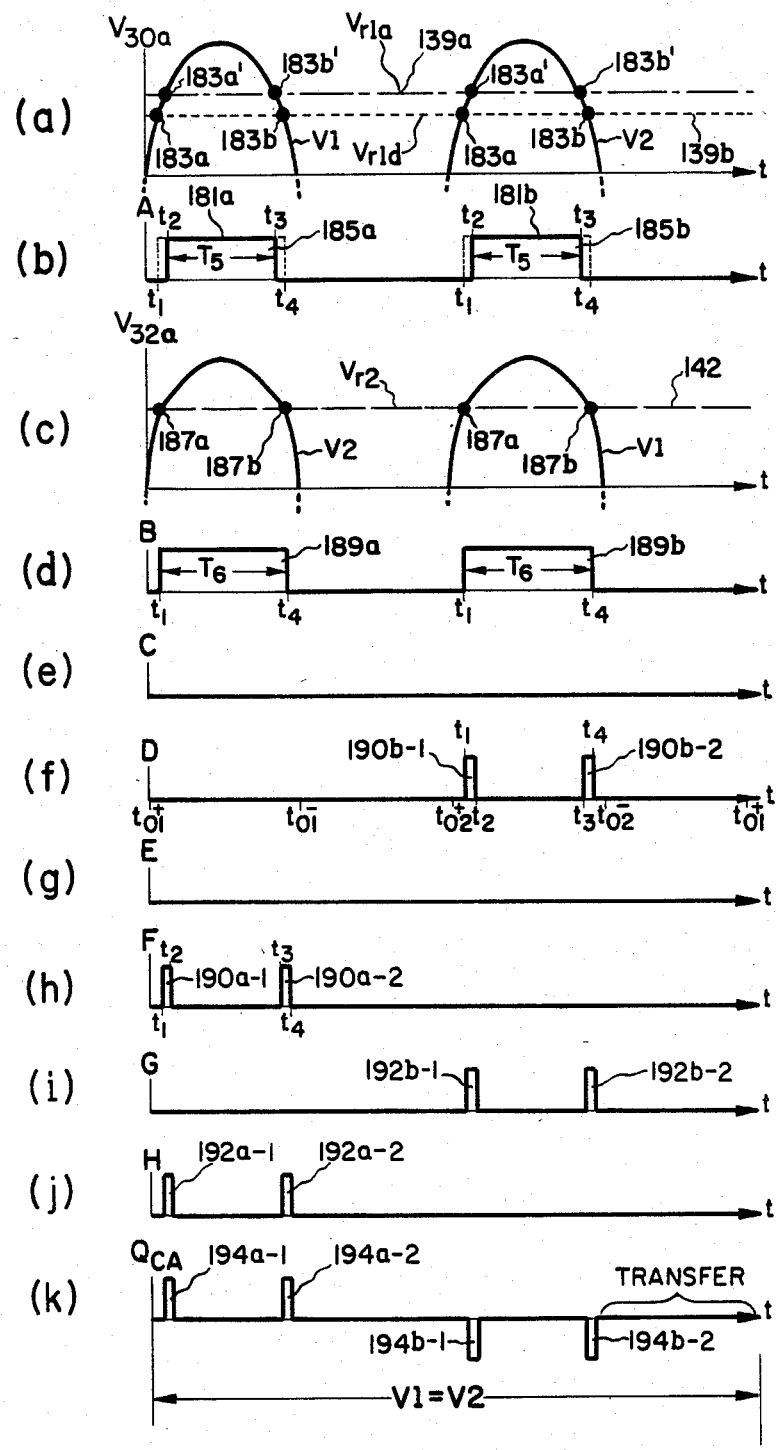

In both cases illustrated in FIGS. 4A and 4B, the ultimate steady-state condition is operation of circuit 10 with the desired load resistance $R_L$ magnitude, and with the load voltage scaled signal $V_1$ substantially equal to the load current scaled signal $V_2$ for each double-source-waveform-cycle. When the load resistance is substantially at the desired magnitude, i.e. with voltages $V1=V2$, the signal waveforms of FIG. 4C apply. During the first positive-polarity source waveform half-cycle (from time $t_{01}{}^+$ to time $t_{01}{}^-$), the scaled load voltage V1 is applied to the first comparator input 30a (FIG. 4C, waveform a) while the scaled load current sampled voltage V2 is applied to the second comparator input 32a (FIG. 4C, waveform c). Each of the substantially-equal-magnitude V1 and V2 waveforms are compared against the respective reference voltage levels $V_{r1a}$ (the actual reference level at first comparator 30) and $V_{r2}$ (the actual reference level at second comparator 32), which is also the desired reference $V_{r1d}$ level in the illustrated example. Because the V1 and V2 half-sinusoid waveforms in the second positive-polarity half-cycle portion of the second waveform are substantially identical to the waveforms applied to like comparators in the first source waveform cycle positive-polarity portion, substantially similar comparison results obtain in both positive-polarity portions. Thus, due to the increased effective reference voltage $V_{r1a}$, the first comparator output voltage A (FIG. 4C, waveform b) rises from its normal logic 0 level to a logic 1 level 181a or 181b, at a time $t_2$ corresponding to the time point $183a'$ when the voltage waveform V1 or V2 crosses the actual $V_{r1a}$ reference level, rather than the somewhat earlier time $t_1$ when the associated V1 or V2 waveform should have crossed the desired reference voltage level $V_{r1d}$ at time point 183a. Similarly, the logic 1 level 181a or 181b portion of the voltage A waveform falls back to the logic 0 level at a time $t_3$ corresponding to the time point $183b'$ when the signal V1 or V2 waveform crosses the actual reference line 139a, earlier than the desired time point 183b for crossing the desired reference line 139b, which should occur at the somewhat later time $t_4$. Thus, the durations $T_5$ of the first comparator output voltage A pulse 185a or 185b is shorter than expected by substantially identical amounts $((t_2-t_1)+(t_4-t_3))$, for either input condition. During the same positive-polarity source waveform half-cycles, the scaled and substantially identical V1 and V2 voltage waveforms are alternately applied to the second comparator input and cross the desired second comparator reference line 142 at the expected points 187a and 187b (FIG. 4C, waveform c), generating a second comparator output B voltage logic 1 pulse 189a or 189b (FIG. 4C, waveform d) which rises to the logic 1 level at time $t_1$ and falls therefrom at time $t_4$, to provide a pulse of duration $T_6$ for either input connection condition. With no offset error (i.e. no difference between actual reference voltage $V_{r1a}$ and desired reference voltage $V_{r1d}$), the duration $T_5$ of the first comparator output A signal and the duration $T_6$ of the second comparator output signal B should be substantially identical and result in the output signals C-F of all four AND gates remaining at the logic 0 level during the entire double-source-waveform set. Because of the effective shift in one comparator reference level, due to offset or other errors in either or both comparators, during the first positive-polarity half-cycle, the fourth AND gate output F voltage (FIG. 4C, waveform h) provides a pair of narrow pulses 190a-1 and 190a-2, respectively commencing at time $t_1$ and terminating at time $t_2$, and commencing at time $t_3$ and terminating at time $t_4$. Similarly, during the second positive-polarity half-cycle, the third AND gate output D voltage (FIG. 4C, waveform f) provides a pair of narrow pulses 190b-1 and 190b-2, also respectively commencing at time $t_1$ and terminating at time $t_2$, and commencing at time $t_3$ and terminating at time $t_4$. Thus, during the first positive-polarity half-cycle the second OR gate 84 output H voltage provides a pair of output charge-addition pulses 192a-1 and 192a-2, adding small pulses 194a-1 and 194a-2 of charge to intermediate storage capacitor 94, while during the second positive-polarity half-cycle, first OR gate output G voltage (waveform i) provides a pair of narrow pulses 192b-1 and 192b-2, providing narrow charge-depletion pulses 194b-1 and 194b-2 of substantially the same durations as charge-addition pulses 194a-1 and 194a-2. The net result is that, prior to the second negative-polarity half-cycle "transfer" interval, when gate 44' is closed, the charge-addition effects of the pair of pulses 194a is substantially cancelled by the charge-depletion pulses 194b, and the voltage across intermediate storage capacitance 94 appears, to capacitor 106, as an unchanged voltage upon closure of switch means 44'. The voltage across capacitance 106 therefore remains substantially unchanged, from the voltage thereacross during previous double-source-waveform-cycle sets, and the power control means conduction interval does not change, maintaining the load current and voltage (and therefore load resistance) magnitudes at the substantially-constant desired value.

While one presently preferred embodiment of my alternating comparator circuitry for improved discrete sampling resistance control has been described in detail herein, many modifications and variations will now become apparent to those skilled in the art. It will be seen that the improved comparator circuit need not be limited to the measurement and/or control of any particular parameter, e.g. resistance as illustrated, but is applicable to all multiple-comparator circuitry. It is my intent, therefore, to be limited only by the scope of the appended claims and not be the specific details and instrumentalities presented by way of explanation herein.

What is claimed is:

1. In a circuit for controlling the resistance of a load receiving energy from an electrical source, said circuit being of the type having: means connected between said source and said load for varying the current flowing through said load responsive to a control signal, means for monitoring the voltage across said load to provide a first signal; means for monitoring the current flowing through said load to provide a second signal; comparison means receiving said first and second signals and first and second reference signals for providing an output signal having a characteristic indicative of the time at which the magnitude of said first signal exceeds the magnitude of the first reference signal with respect to the time at which the magnitude of the second signal exceeds the magnitude of the second reference signal; and means for providing said control signal responsive to said comparison means output signal to cause said load resistance to be maintained at a substantially constant and predetermined value, the improvement wherein said comparison means comprises:

first and second comparators, each having a first input, a second input receiving one of said reference signals, and an output;

input switching means for connecting said first signal to said first comparator first input and said second signal to said second comparator first input responsive to a first state of a comparison control signal and for connecting said first signal to said second comparator first input and said second signal to said first comparator first input responsive to another state of said comparison control signal;

intermediate means for temporarily storing the magnitude of a physical quantity to provide said comparison means output signal responsive to a change in said physical quantity magnitude; and difference means for controlling the physical quantity magnitude responsive to the difference in the signals at said first and second comparator outputs during consecutive occurrences of the first and second comparison control signal states to effectively compensate the change in physical quantity magnitude for any errors introduced by at least one of the first and second comparators.

2. The improved circuitry of claim 1, further comprising switching means for selectively providing the change in said physical quantity of said intermediate means to said control-signal-providing means only upon receipt of an enabling signal available only after completion of an even number of consecutive comparison control signal state operations of said input switching means.

3. The improved circuitry of claim 2, further comprising switching control means for providing said first and second comparison control signal states and said switching means enabling signal subsequently thereafter, responsive to a periodic signal.

4. The improved circuitry of claim 3, wherein said source is an A.C. source and said switching control means provides said first and second comparison control signal states and said switching means control signal responsive to the polarity of the A.C. source waveform during sequentially pairs of voltage waveform cycles thereof.

5. The improved circuitry of claim 2, wherein said switching means comprises a bidirectionally-conductive device having a controlled-conduction channel connected for transmission of said comparison means output signal to said control-signal providing means, responsive to enablement of a control input.

6. The improved circuitry of claim 1, wherein said difference means is adapted to vary the physical quantity magnitude in accordance with the algebraic difference in the magnitude of signals at first and second inputs of said intermediate means, and further including means for connecting the first comparator output to said first intermediate means input and said second comparator output to said second intermediate means input responsive to said first comparison control signal state and for connecting said first comparator output to said second intermediate means input and said second comparator output to said first intermediate means input responsive to said second comparison control signal state.

7. The improved circuitry of claim 1, wherein said input switching means comprises first and second input switch means each having a common terminal receiving an associated one of the first and second signals, a first selectable output respectively connected to the respective first inputs of the respective first and second comparators, a second selectable output respectively connected to the respective first inputs of the respective second and first comparators, and a control input for simultaneously connecting the first and second switching means common terminals to the first selectable terminal of the associated first and second switch means responsive to said first comparison control signal state and for simultaneously connecting the respective first and second switch means common terminal to the associated switch means second selectable terminal responsive to said second comparison control signal state.

8. The improved circuitry of claim 7, wherein each of said first and second input switch means comprises a pair of controlled bidirectionally-conductive devices, each device having a control terminal enabled by only one of the first and second comparison control signal states, each device having a controlled-conduction circuit having first and second terminals, with the first terminal of each device connected in common to receive the associated one of said first and second signals, and with one of the remaining controlled-conduction circuit terminals being connected to a different first input of the respective first and second comparators.

9. The improved circuitry of claim 1, wherein said physical quantity is electrical charge and said physical quantity storing means is an electrical capacitance.

10. The improved circuitry of claim 9, wherein said difference means includes: first means for depleting charge from said capacitance responsive to a first intermediate signal; second means for adding charge to said capacitance responsive to a second intermediate signal; and first and second digital networks, each receiving the output of both of said first and second comparators and said first and second comparison control signal states, for providing the respective first and second intermediate signals to vary the net charge stored in the capacitance to provide said comparison means output signal.

11. The improved circuitry of claim 10, wherein each comparator further includes means for providing the logical inversion of the output signal thereof to each of said first and second digital networks.

12. The improved circuitry of claim 11, wherein each of said digital networks comprises: first and second AND gates each having three inputs and an output; the first input of said first and second gates respectively receiving the associated comparator non-inverted and inverted output signals, respectively; the second input of each AND gate receiving the inverted and non-inverted outputs of the second comparator, respectively; and the third input of each AND gate being enabled by the respective one of the first and second comparison control signal states; and an OR gate having a first input connected to the output of the first AND gate, a second input connected to the output of the second AND gate and an output providing the associated intermediate signal.

13. The improved circuitry of claim 10, wherein each of the charge-depleting first means and charge-adding second means comprises: a substantially-constant current source and a controlled-conduction element connected between the associated source and a common terminal of said capacitor, each controlled-conduction element having a control input receiving the associated one of the first and second intermediate signals for controlled connection of the associated current source to said intermediate storage capacitance.

14. The improved circuitry of claim 1, wherein each of said first and second comparator second inputs receive the same reference voltage, and further comprising means for scaling the magnitude of said first and second signals to have substantially identical instantaneous magnitudes at a predetermined load resistance value.

15. The improved circuitry of claim 1, wherein said difference means substantially completely compensates for the effective errors between said first and second comparator outputs only when said load resistance is substantially at said predetermined constant value.

16. A comparator circuit for substantially reducing the error in the magnitude of an output signal therefrom responsive to at least offset errors of at least comparator means therein, comprising:

first and second circuit input means for receiving first and second input signals;

circuit output means for providing a circuit output signal;

first and second comparator means each having a first input, a second input receiving an associated one of first and second reference signals, and an output;

first input switching means for respectively connecting said first circuit input means respectively to the first input of the respective one of said first and second comparator means respectively responsive to first and second states of a control signal;

second input switching means for respectively connecting said second circuit input means to the first input of the respective one of said second and first comparator means respectively responsive to said first and second control signal states;

first and second intermediate terminals;

first and second output switching means for respectively connecting the first and second comparator outputs respectively to said first and second intermediate terminals responsive to said first control signal state and for connecting said first and second comparator outputs respectively to said second and first intermediate terminals responsive to said second control signal state; and means for providing the algebraic difference of the signals at the first and second intermediate terminals during the respective first and second control signal states and for intermediately storing the difference results thereof, for providing a comparator output signal to said circuit output means substantially only responsive to a difference between said first and second input means signals and only after the completion of a sequential set of said first and second signal states.

17. The circuit of claim 16, wherein each of said first and second circuit input means further comprises means for scaling said first and second input signals to have substantially similar instantaneous magnitudes, and said first and second reference signals are identical.

18. The circuit of claim 16, further including means for connecting said comparator output signal to said circuit output means only after completion of said sequential first and second control signal states.

19. The circuit of claim 18, wherein each of said first and second input means and said first and second output switching means includes at least one controlled-bidirectional-conductive element.

* * * * *